(12) United States Patent
Mocnik

(10) Patent No.: US 11,199,225 B2
(45) Date of Patent: Dec. 14, 2021

(54) BEARING CAGE FOR A ROLLING-ELEMENT BEARING

(71) Applicant: AKTIEBOLAGET SKF, Gothenburg (SE)

(72) Inventor: Alexander Mocnik, Steyr (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/860,399

(22) Filed: Apr. 28, 2020

(65) Prior Publication Data

US 2020/0355222 A1   Nov. 12, 2020

(30) Foreign Application Priority Data

May 8, 2019   (DE) .......................... 102019206594.5

(51) Int. Cl.
*F16C 33/38* (2006.01)
*F16C 33/46* (2006.01)
*F16C 19/30* (2006.01)

(52) U.S. Cl.
CPC ........ *F16C 33/3875* (2013.01); *F16C 19/305* (2013.01); *F16C 33/4641* (2013.01); *F16C 2226/38* (2013.01)

(58) Field of Classification Search
CPC .............. F16C 33/3862; F16C 33/3875; F16C 33/4641; F16C 33/4652; F16C 2226/38
See application file for complete search history.

(56) References Cited

U.S. PATENT DOCUMENTS

| 3,256,051 A | 6/1966 | Charles |
| 3,944,307 A * | 3/1976 | Bingle ................ F16C 33/4652 384/576 |
| 4,568,206 A * | 2/1986 | Imazaike ............ F16C 33/3875 384/530 |
| 4,902,145 A | 2/1990 | Johnson |
| 8,523,450 B2 * | 9/2013 | Maejima ............ F16C 33/6674 384/531 |
| 2011/0229068 A1 | 9/2011 | Bohr et al. |

(Continued)

FOREIGN PATENT DOCUMENTS

| DE | 2145013 A1 | 3/1972 |
| DE | 3313583 A1 | 10/1984 |
| DE | 102015220363 A1 | 5/2017 |

(Continued)

OTHER PUBLICATIONS

Brochure from the company Weber Ultrasonics "The Best Bond Ultrasonic Welding" dated Oct. 2017.

(Continued)

*Primary Examiner* — James Pilkington
(74) *Attorney, Agent, or Firm* — J-Tek Law PLLC; Scott T. Wakeman; Mark A. Ussai

(57) ABSTRACT

First and second bearing cage halves each having an annular base body and a plurality of pins extending from the base body and a plurality of pin receptacles, the first and second cage haves forming a bearing cage when the pins are received into the pin receptacles. A body of sacrificial material is located on the pins and/or in the pin receptacles which body is configured to be melted ultrasonically to join the first cage half to the second cage half and form the bearing cage.

17 Claims, 8 Drawing Sheets

(56) References Cited

U.S. PATENT DOCUMENTS

2017/0108043 A1   4/2017   Mocnik et al.

FOREIGN PATENT DOCUMENTS

| EP | 2373897 A1 | 10/2011 |
|----|------------|---------|
| GB | 1353045 A  | 5/1974  |
| JP | 2006258168 A | 9/2006 |
| WO | 2010063651 A1 | 6/2010 |

OTHER PUBLICATIONS

Brochure from the company Weber Ultrasonics "Beste Verbindungen Schweiβen mit Ultraschall" dated Oct. 2017.
Office Action from the German Patent Office in related application No. DE 10 2019 206 594.5 dated Jan. 17, 2020, and partial translation thereof.

\* cited by examiner

BEARING CAGE FOR A ROLLING-ELEMENT BEARING

CROSS-REFERENCE

This application claims priority to German patent application no. 10 2019 206 594.5 filed on May 8, 2019, the contents of which are fully incorporated herein by reference.

TECHNOLOGICAL FIELD

The present disclosure is directed to a two-part bearing cage for a rolling-element bearing and to an ultrasonic welding device according for welding the bearing cage.

BACKGROUND

For various applications, for example, in ball bearings, it is known to use two-part bearing cages that are composed of identical bearing cage halves. However, with bearing cages used up to now the retaining elements used for connecting the two bearing cage halves can bend radially outward at high rotational speeds so that the cage expands and thus comes into contact with the outer ring. This lead to increased friction and/or a jamming of the rolling elements. Known bearing cages are also not suitable for high loads in the radial and axial directions, since in the event of a failure of the retaining elements used, both the radial and the axial retention ability of the cage are lost.

SUMMARY

It is therefore an aspect of the present disclosure to provide a two-part bearing cage that is also suitable for high rotational speeds and that can withstand high radial and axial loads.

The bearing cage is comprised of a first cage half and a second cage half, preferably configured identically to the first cage half, which cage halves each include an annular base body and pins extending axially therefrom and complementarily configured pin receptacles. The pins of the one cage half can engage into the pin receptacles of the other cage half so that the pins engaging into the pin receptacles form bearing cage bridges adjacent pairs of which form bearing cage pockets for receiving the rolling elements of the rolling-element bearing.

In order to securely retain the two cage halves even at high rotational speeds, the pins and/or the pin receptacles include a sacrificial material on the respectively contacting surfaces. When the first cage half and the second cage half are assembled, this sacrificial material is melted by the action of ultrasound and subsequently connects the two cage halves.

The use of ultrasound makes possible a rapid connection of the cage halves that is simple to carry out and is durable. The sacrificial material can melt due to the action of ultrasound in order to connect the first and the second cage half not only at the contacting surfaces at which the sacrificial material was originally present, but rather can also extend to further contacting surfaces of the two cage halves by spreading in the molten state and flowing into gaps possibly present between the cage halves. In this way the connection between the two cage halves can be further improved.

According to one embodiment, each pin receptacle includes a radially outwardly disposed, axially extending ring section that radially outwardly supports each pin engaging into the pin receptacle. Due to the radial support that is present for each pin, the pins can be prevented from bending radially outward. It can thus be ensured that no contact of the bearing cage with the outer ring arises, even at high rotational speeds. In this way neither is the friction in the bearing increased, nor is an early bearing failure to be expected.

Here it is preferred when the axially extending ring section is formed over the annular base body of the cage half. Due to this integral design between ring section and the annular base body, radial forces that are introduced on the ring section can be diverted to the base body so that even with high stress of the ring section a widening of the cage radially outward is prevented.

According to a further exemplary embodiment each pin includes a gradation (step) radially outward that interacts with the ring section of the pin receptacle such that the cage bridge formed by the pin and pin receptacle has a homogeneous outer surface. This homogeneous outer surface makes it possible that, for example, lubricant that is located in the region of the bearing and of the bearing cage is not collected in recesses on the cage body, thus causing the lubricant flow and thus the lubrication of the rolling elements to no longer be available. In addition, the homogeneous outer surface makes it possible that a trouble-free guiding of the rolling elements is possible via the cage bridges.

During the assembling of the two cage halves, these are first held at a spacing by the sacrificial material. If the sacrificial material is melted by the action of ultrasound, this spacing is no longer present and the two cage halves are pushed together more closely. Due to the gradations it can be ensured here that during the melting of the sacrificial material the two cage parts cannot be pushed together farther than desired, but rather abut against the gradations. In this way it can also be prevented that in the fully connected cage the rolling elements clamp between the two cage parts, since the gradations ensure a defined spacing between the cage halves.

According to a further embodiment, each cage half includes a cage pocket half, wherein the cage pocket has a toroidal pocket geometry that is adapted radially inward to a spherical shell and extends radially outward cylindrically. Due to this toroidal pocket geometry the rolling element, in particular a ball, can be completely enclosed radially inward, which leads to a particularly good rolling-element guiding. In addition, the cylindrical outer design of the pocket geometry allows a good supplying of lubricant, since the rolling elements are not directly enclosed radially outward, but rather a gap remains between rolling element and pocket, into which the lubricant can easily penetrate.

According to a further embodiment the cage is manufactured from plastic, in particular from an injection-moldable plastic. Particularly advantageous here is a plastic such as PEEK, PA4.6, or PA6.6 that is preferably manufactured with a carbon or glass fiber content of 15% to 30%. Such plastic cages are easy to manufacture and also simple to assemble in two-part form. Since the bearing cage proposed here uses the above-described pins for support, the plastic cage remains stable even at high rotational speeds. Such a light plastic cage can be used in particular in ball bearings. Due to the use of a plastic cage, high rotational speeds can be achieved, since the plastic cage has a low weight.

According to a further embodiment, the sacrificial material is wedge-shaped, pyramid-shaped, or conical. Other forms are also possible. In each case the sacrificial material is provided as additional material on the pin and/or the pin receptacle; the sacrificial material melts due to the action of ultrasound. The sacrificial material is preferably comprised of a plastic material that has a lower melting temperature than the remaining cage material.

In order to be able to melt the sacrificial material by the action of ultrasound, the first cage half and/or the second cage half can include a primary contact surface that is adjacent to the contacting surfaces. Due to the primary contact surface, ultrasound can be conducted particularly well into the contacting surfaces and/or into the sacrificial material. The ultrasonic welding device is preferably applied to the primary contact surface in order to direct the ultrasound via the primary contact surface to the contacting surfaces or into the sacrificial material.

According to a further embodiment, the first cage half and/or the second cage half include a secondary contact surface that is opposite the contacting surface and is configured to direct ultrasound into the contacting surfaces and/or into the sacrificial material. Here the secondary contact surface can lie opposite the contacting surfaces in the axial orientation of the cage. In this way the sacrificial material can preferably be heated by the ultrasound from two sides (by the primary and the secondary contact surface) in the axial direction.

In addition, a wedge-shaped surface can be formed on each of the cage bridges; the wedge-shaped surface is configured to direct ultrasound from the secondary contact surface to the contacting surfaces. The wedge-shaped surface can include material that is particularly suitable for conducting ultrasound. This material can be realized, for example, by fiber components in the plastic of the cage material. Due to the conducting of ultrasound to the secondary contact surface, the melting of the sacrificial material can be accelerated.

According to a further aspect, an ultrasonic welding device is proposed that is adapted to the shape of such a two-part bearing cage. The ultrasonic welding device can be comprised of a first part that is applied to the first cage half, and a second part that is applied to the second cage half.

According to a further aspect, a bearing cage is proposed for a rolling-element bearing including a first cage half and a second cage half, preferably configured identically to the first cage half, which bearing cage halves each include an annular base body and pins extending axially therefrom, and complementarily configured pin receptacles. The pins of the one cage half engage into the pin receptacles of the other cage half, and due to the engagement into the pin receptacles the pins form bearing cage bridges, between which the bearing cage pockets are formed for receiving the rolling elements of the rolling-element bearing. The pins and/or the pin receptacles are connected at least at the respectively contacting surfaces by a layer that is comprised of a molten sacrificial material. The sacrificial material can preferably be comprised of the same material as the two cage halves.

Due to the ultrasonic welding process the sacrificial material is melted and remains inside the cage structure. This means that the layer that connects the pins and the pin receptacles to each other is configured as a weld connection and is located completely in the interior of the cage, and therefore no externally visible weld seams or weld points are present.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
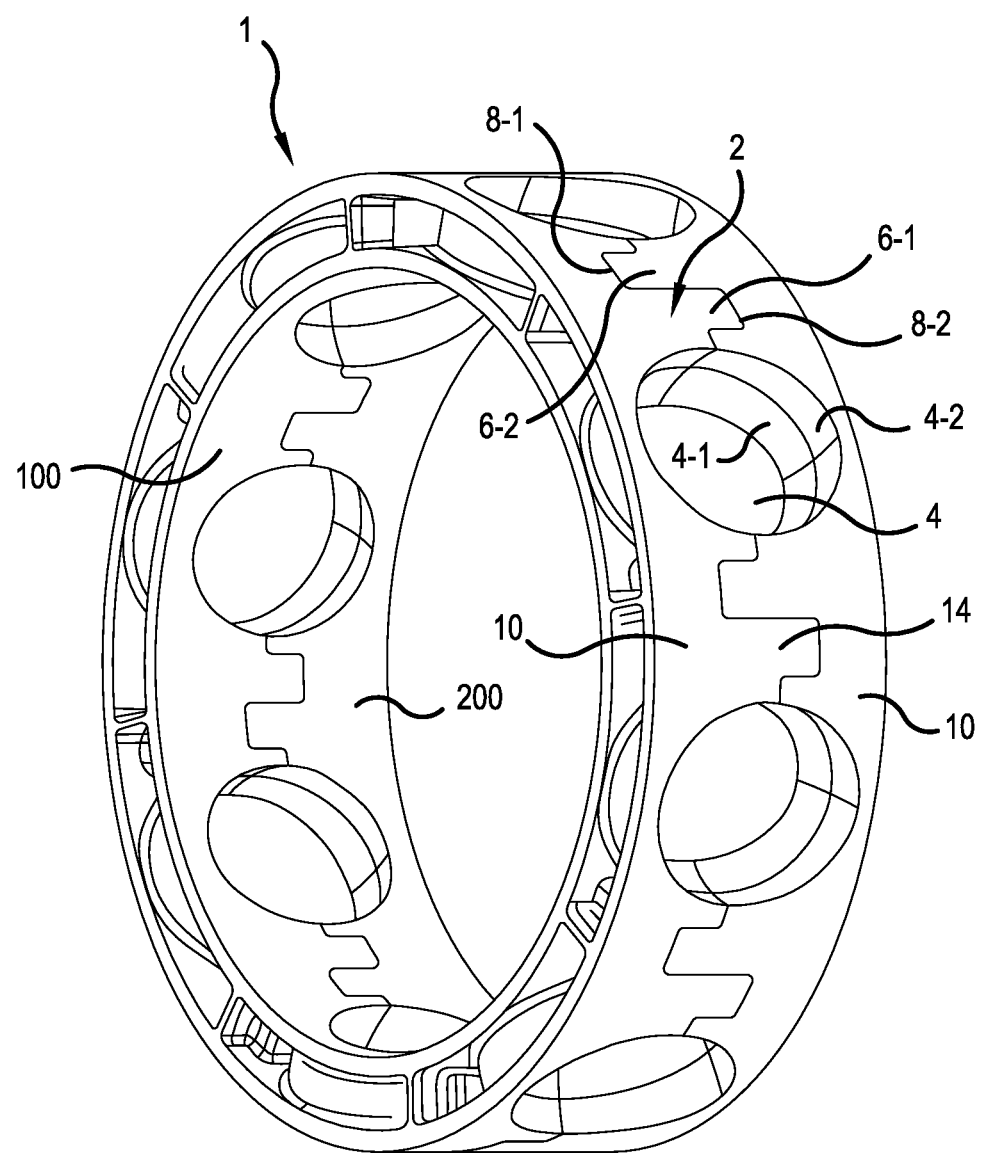
FIG. 1 is a schematic perspective view of a two-part bearing cage.

FIG. 1 shows a schematic spatial view of a bearing cage for a ball bearing 1 that is formed from a first bearing cage half 100 and a second bearing cage half 200. Here the bearing cage halves 100 and 200 are configured identically. As can be further seen from FIG. 1, the bearing cage 1 includes bridges 2 that form cage pockets 4 between them, wherein rolling elements (not depicted) are receivable. Here the cage pockets 4 have a toroidal shape; this means that the cage pockets 4 are configured spherical on their radially inner side 4-1, while they are configured cylindrical on their radially outer side 4-2. This toroidal design makes it possible that the rolling elements, i.e., the balls, are well guided by the radially inner region 4-1 and are entirely enclosed in the pockets 4, while on their radially outer region 4-2 they have a spacing to the bearing cage 1 such that lubricant can penetrate into the gap between rolling element and bearing cage 1, whereby a particularly good lubricating of the balls is made possible. Furthermore it can be seen from FIG. 1 that the cage bridge 2 formed by the pins 6-1, 6-2 engaging into corresponding pin receptacles 8-1, 8-2 of the respective cage halves 100, 200. The engagement of the pins 6-1, 6-2 into the pin receptacles 8-2, 8-1 is configured here such that both a radial and an axial fixing of the cage halves 100, 200 is possible.

Each cage half 100 includes an annular base body 10 from which the pins 6 extend, and in which the pin receptacles 8 are formed. Here each pin receptacle 8 includes an axially extending ring section 12 that extends axially over the pin 6 when a pin 6 is received in the receptacle 8 and thus supports the pin 6 radially outward. This axial ring section 12 prevents the cage pins 6 from bending radially outward and contact a bearing ring adjacent to the bearing cage 1 even under high centrifugal forces, which could lead to increased friction and to a premature bearing failure. Furthermore it can be seen in FIGS. 2 and 3 that the ring section 12 is formed integrally with the annular base body 10. The radial forces can thereby be supported and diverted into the base body 10 so that even with high radial loads a bending-open of the cage 1 does not occur.

In order to achieve a particularly good engagement and, as depicted, for example, in FIG. 1, a homogeneous outer surface 14 on the bearing cage 100, the pin 6 includes a gradation (step) 16 that interacts with the ring section 12. The design of pin 6 and pin receptacle 8 can also be seen in enlarged sections of FIGS. 2 to 6.

Figure 2:
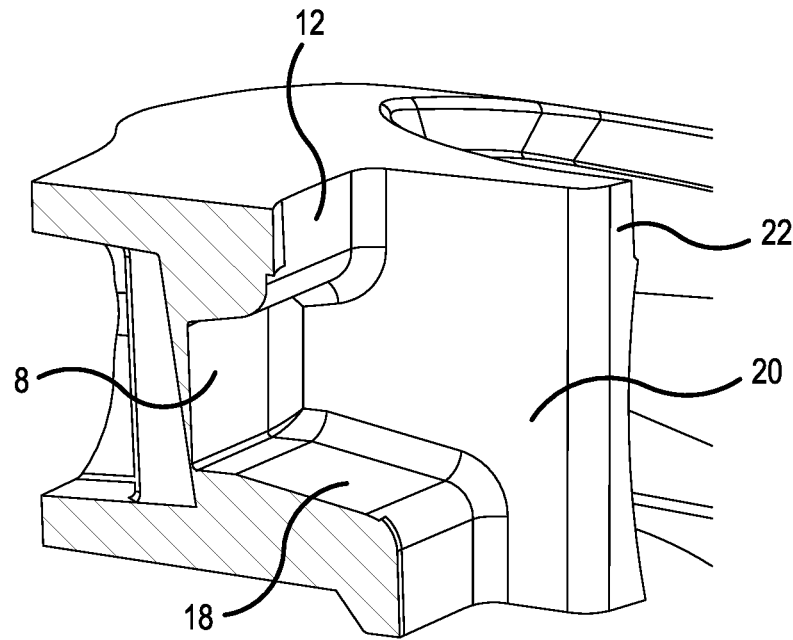
FIG. 2 is a schematic detail view of the first cage half.
Figure 3:
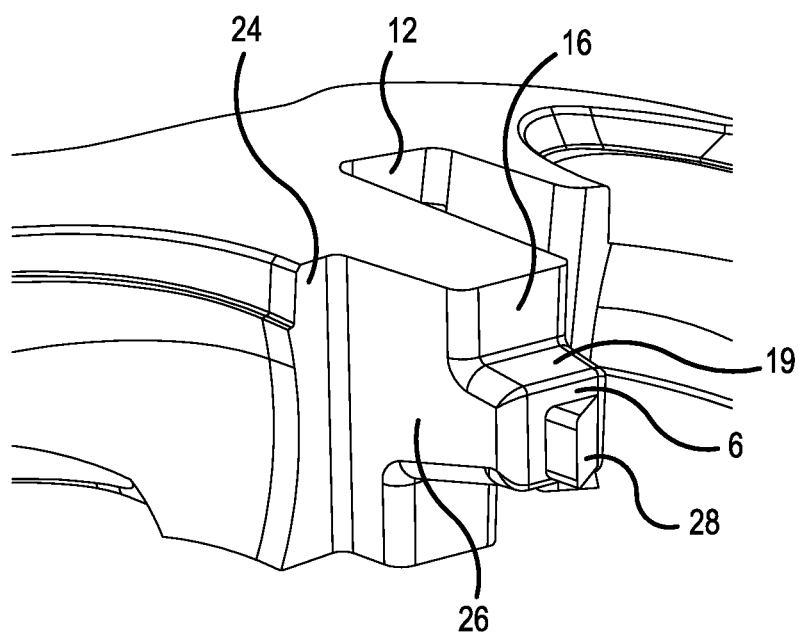
FIG. 3 is a schematic detail view of the second cage half.

FIG. 2 shows a schematic view of a cage half 100, 200. In order to be able to correctly assemble the two cage half 100, 200, a side surface 18 is provided on the pin receptacle 8, which side surface 18 serves as a centering surface for the corresponding pin 6. The pin receptacle 8 includes a further centering surface 20 that also serves for the correct insertion of the pin 6. Corresponding stop surfaces 22, 24 are provided on the pin receptacles 8 and the pins 6. In addition to the gradations 16, these stop surfaces 22, 24 prevent the two cage halves 100, 200 from being pushed together too far such that they abut against each other at the stop surfaces 22, 24. In this way sufficient space is provided in the cage 1 for the balls.

Figure 4:
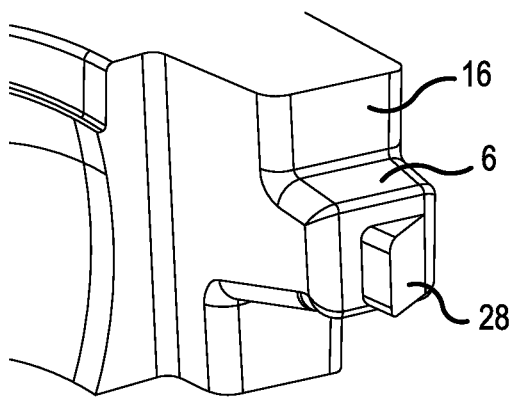
FIG. 4 is a first exemplary embodiment of the sacrificial material of FIGS. 2 and 3.
Figure 5:
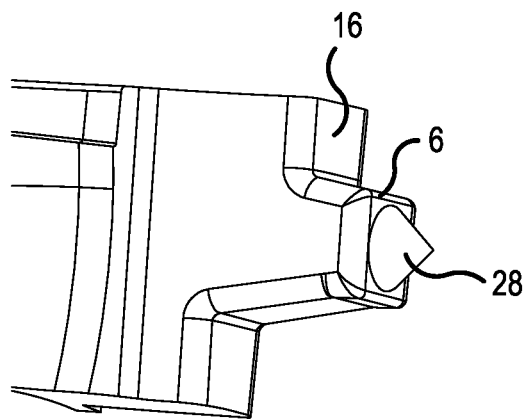
FIG. 5 is a second exemplary embodiment of the sacrificial material of FIGS. 2 and 3.
Figure 6:
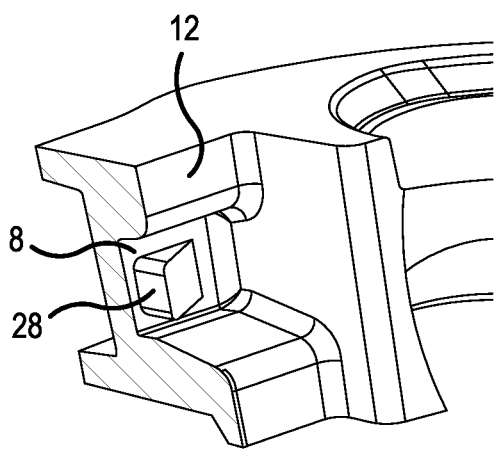
FIG. 6 is a third exemplary embodiment of the sacrificial material of FIGS. 2 and 3.

Sacrificial material 28 is provided on the pins 6 or the pin receptacles 8 or both that is melted by ultrasound after assembling the cage halves 100, 200. Here the sacrificial material is provided on surfaces of the pins 6 and/or of the pin receptacles 8, which surfaces contact each other in the assembled state. The sacrificial material can have various shapes, such as, for example, wedge-shaped (see FIG. 4), conical (see FIG. 5) or also be pyramid-shaped or spherical. Instead of providing the sacrificial material on the pin 6, as is shown in FIGS. 4 and 5, the sacrificial material can also be provided in the pin receptacle 8, as is depicted in FIG. 6. Furthermore, the sacrificial material can be provided both on the pins 6 and in the pin receptacles 8.

Figure 7:
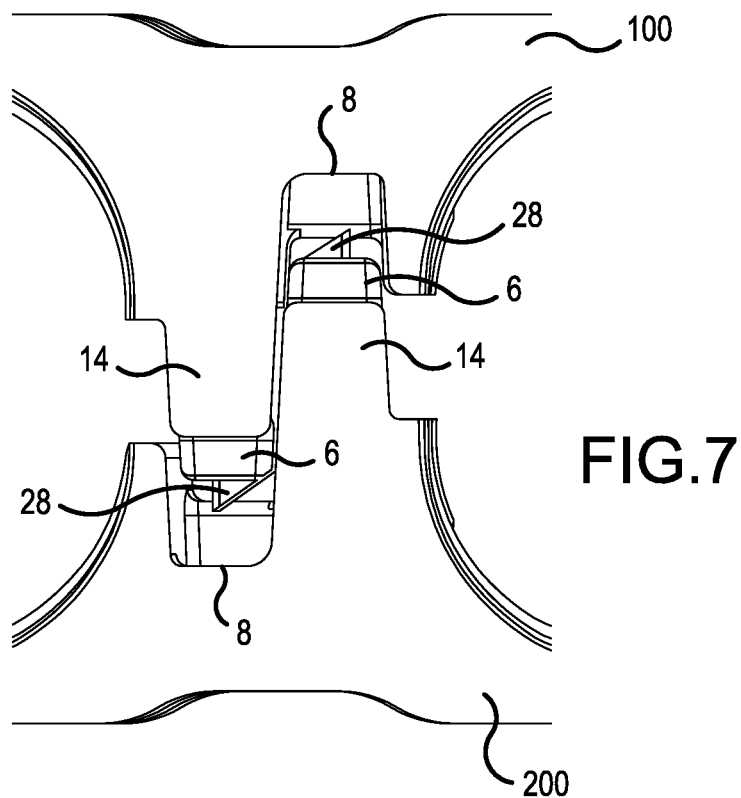
FIG. 7 is a schematic representation of the assembly of the two cage halves.
Figure 8:
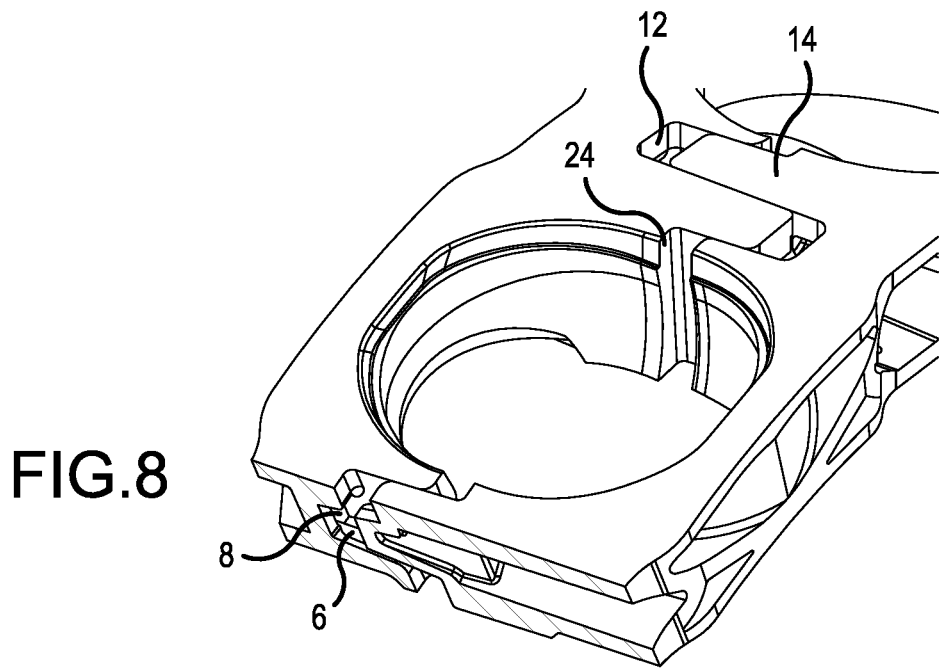
FIG. 8 is a further schematic representation of the assembly of the two cage halves.
Figure 9:
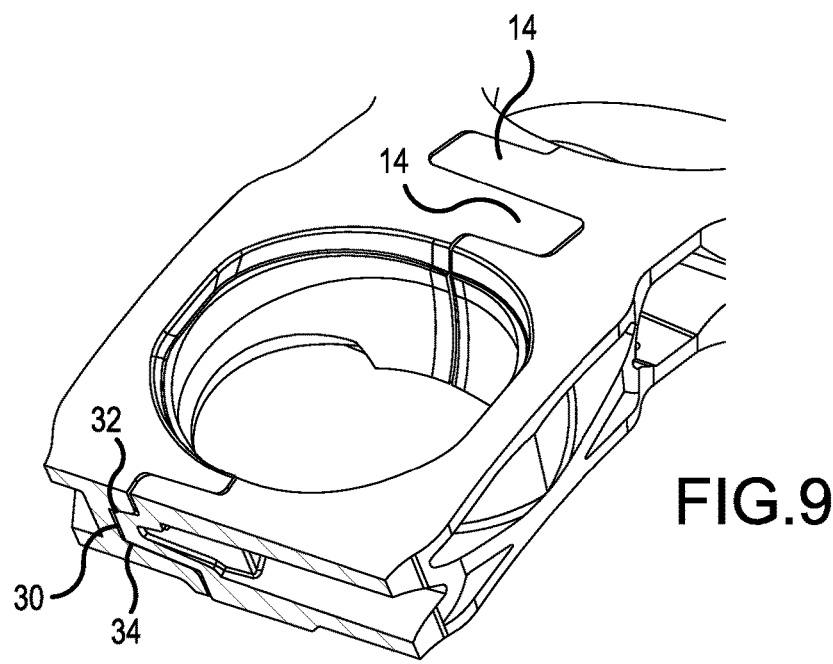
FIG. 9 is a further schematic representation of the assembly of the two cage halves.
Figure 10:
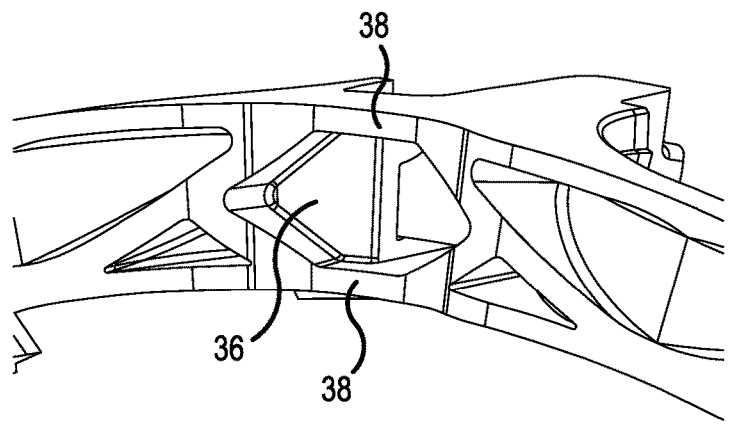
FIG. 10 is a schematic detail view of the cage halves including contact surfaces for the ultrasonic welding device.
Figure 11:
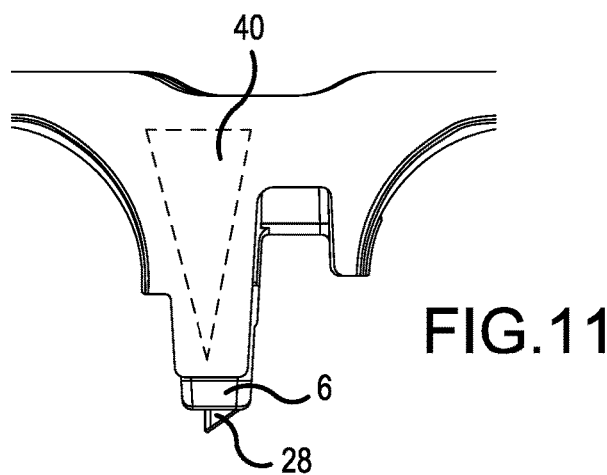
FIG. 11 is a further schematic detail view of the cage halves including contact surfaces for the ultrasonic welding device.
Figure 12:
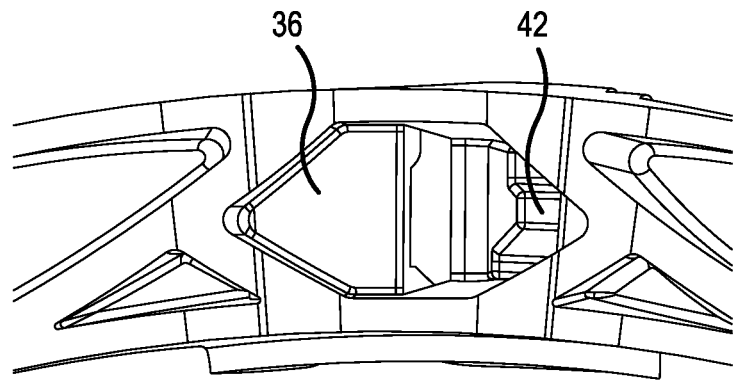
FIG. 12 is a further schematic detail view of the cage halves including contact surfaces for the ultrasonic welding device.
Figure 13:
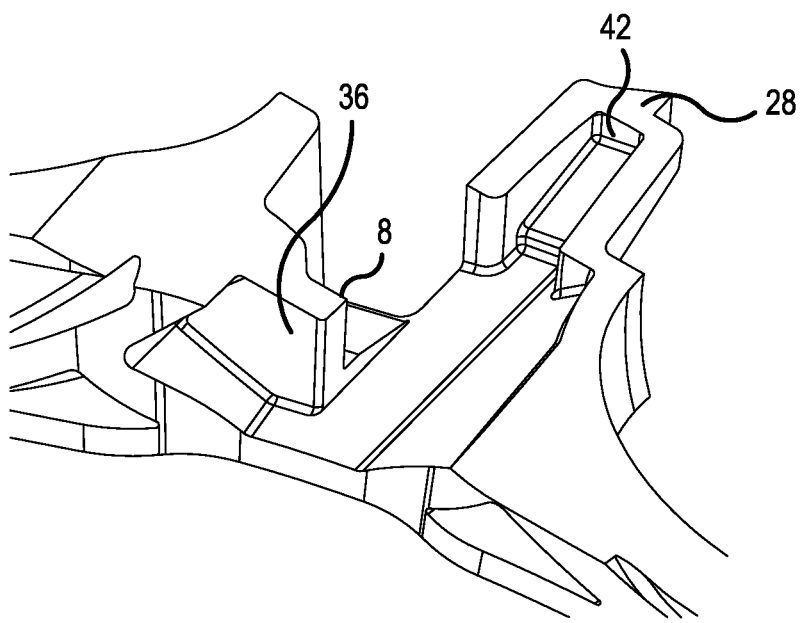
FIG. 13 is a further schematic detail view of the cage halves including contact surfaces for the ultrasonic welding device.

In FIGS. 7 to 9 the assembly of the two cage halves 100, 20 is now described. During assembly of the two symmetrical cage halves 100, 200, they are aligned in the radial direction with the aid of the centering surface 19, and in the circumferential direction by the surfaces 20, 26. This has the advantage that possible distortions, deformations, or dimensional deviations caused by the manufacturing process of the cage half 100, 200 can thereby be compensated for.

During the assembling of the two cage halves 100, 200, a gap of a plurality of millimeters remains between the two cage halves. If the sacrificial material 28 is melted by the ultrasonic welding, the sacrificial material 28 flows into the connecting surface 30, 32, 34 (see FIG. 9). A possible clearance between the cage halves 100, 200, which can arise due to manufacturing tolerances, can thereby be eliminated. During the operation of the bearing, relative movements can therefore no longer arise that would lead to damage of the cage 1.

The stop surfaces 22, 24 define the axial spacing of the cage halves. Since the axial spacing is defined via these surfaces, a constant width of the ball pockets 4 can be ensured. A minimum width cannot thereby not be fallen below, so that during the assembly or in operation of the bearing the balls cannot jam in the pocket. Such a jamming could arise due to different temperature-induced expansions of the different materials, for example, with balls made of steel or ceramic and a plastic cage. Furthermore, a possible gap in the pockets 4 can also be avoided by the axial stop via the stop surfaces 22, 24, which possible gap in the pockets 4 would cause negative properties in operation. Such a gap could lead to a cage or ball wear and have negative effects on the lubricating film.

In FIGS. 10 to 13, contact surfaces 36, 38, 42 are depicted for conducting ultrasound from the ultrasonic welding device to the pins 6 or pin receptacles 8 and the corresponding sacrificial material 28. The contact surfaces include a primary contact surface 36 and two secondary contact surfaces 38 per cage bridge. Here the primary contact surface 36 abuts directly against the sacrificial material 28. This is shown, for example, in FIG. 13: here the primary contact surface 36 lies opposite the pin receptacle 8. In this way, ultrasound can be introduced directly into the sacrificial material 28. The primary contact surface 36 thus provides that the ultrasound is introduced directly into the surface including the sacrificial material 28 or an opposing surface.

In addition, ultrasound is introduced via adjacent surfaces 38 and is also conducted to the sacrificial material 28 via the wedge-shaped cage bridge half 40. Here the cage 1 can preferably include fiber components in the plastic, in particular carbon-fiber components, that help to effectively conduct the ultrasound to the sacrificial material 28. Due to the primary and secondary contact surfaces 36, 38 and the cage bridge half 40, it is possible to conduct ultrasound to the pin receptacles 8 or the opposing surfaces, and the pins 6 or the opposing surfaces, so that the sacrificial material 28 is melted particularly well.

In some embodiments of the cage 1, the ultrasonic welding device can be extended up to a further primary contact surface 42 that is located in the pins 6. This is useful in particular in wider variants of the cage 1, since with increasing spacing of the two weld points per cage pocket bridge, the ultrasound cannot carry forward sufficiently. This can be prevented by the further primary contact surface 42.

Figure 14:
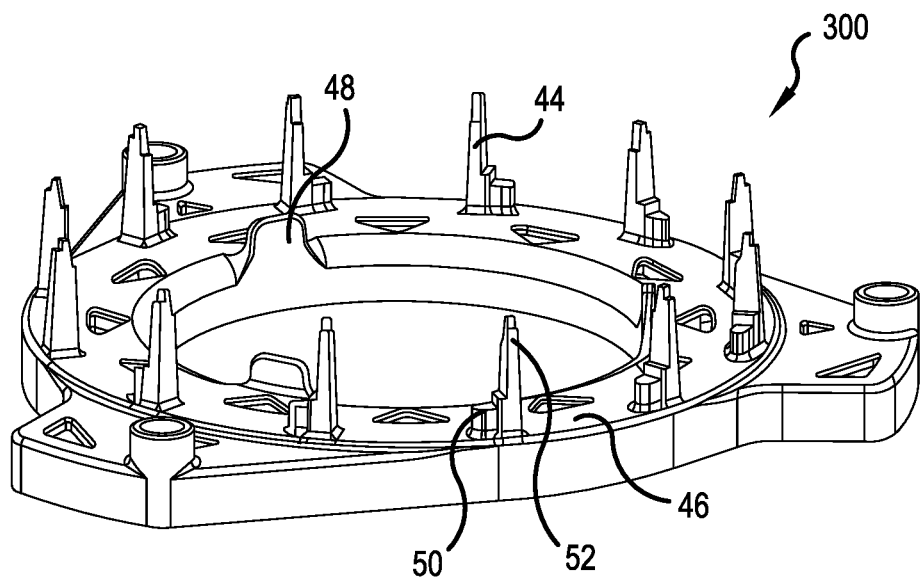
FIG. 14 is a schematic perspective view of a retaining device for an ultrasonic welding device.
Figure 15:
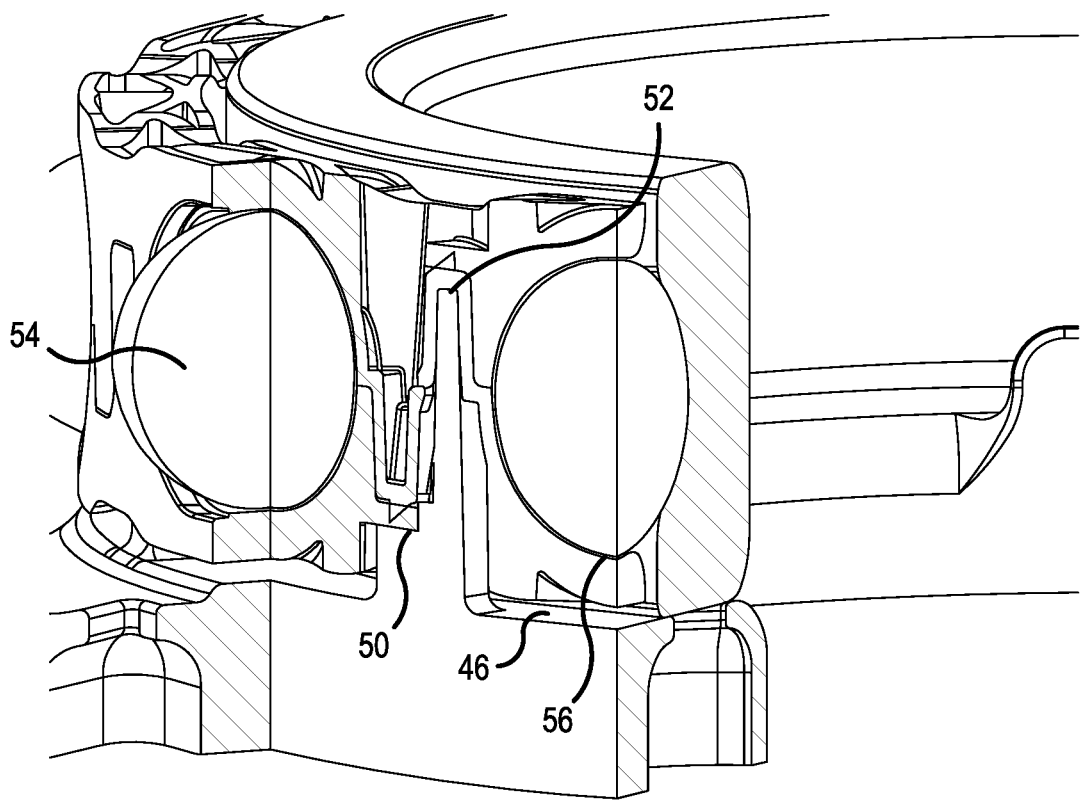
FIG. 15 is a schematic perspective view of the retaining device of FIG. 14 including an assembled bearing cage.
Figure 16:
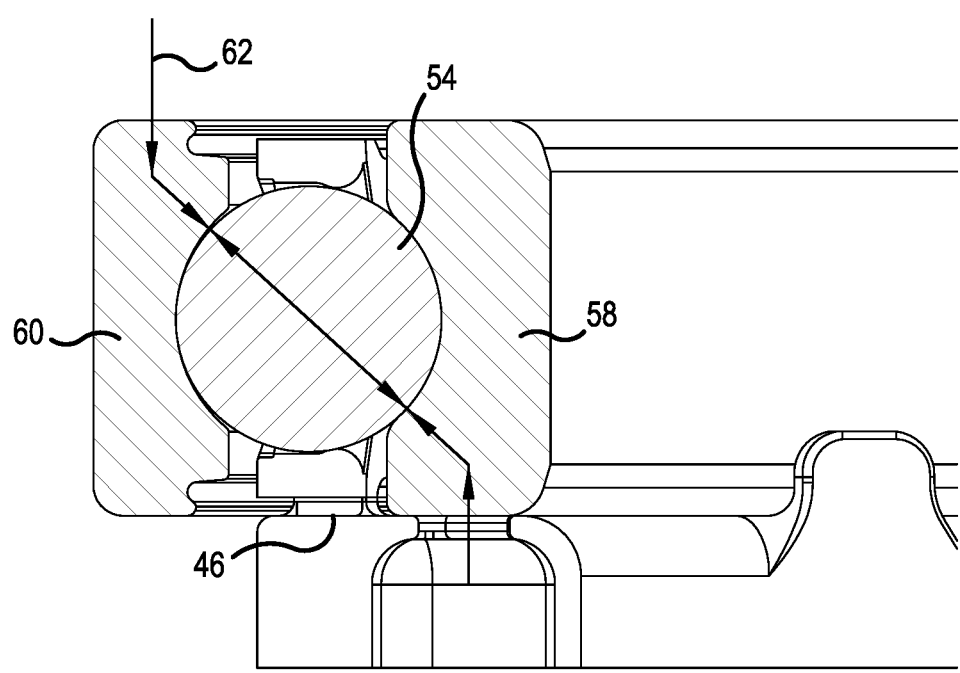
FIG. 16 is a sectional view of FIG. 15.

FIGS. 14 to 16 show a retaining device 300 of an ultrasonic welding device. The retaining device 300 shows a negative shape 44 of the cage rear side. The negative shape 44 has the corresponding number of ball pockets, a support surface 46 for the bearing inner ring, and a centering device 48 for the bearing inner ring. Here the negative shape 44 is configured such that the rear surfaces of the pin receptacles 8 and of the pins 6 are primarily supported, since these surfaces must support the force exerted during ultrasonic welding. Furthermore, a rotating of the cage half 100, 200 about the axis of rotation of the bearing will be prevented in order to achieve a high positional accuracy during ultrasonic welding. This is also achieved by the negative shape 44 and the support surfaces 46, 48.

The support surface 46 supports the bearing inner ring in the vertical direction during the ultrasonic welding. In addition, the centering device 48 for the bearing inner ring positions it such that it cannot collide with the ultrasonic welding device due to the cage clearance. Further support surfaces 50, 52 are provided for the cage, wherein the vertical spacing of the support surfaces 50, 52 to the support surface 46 is configured such that an encircling gap 56 exists between the rolling elements and the cage halves 100, 200. This will prevent the rolling elements from being in direct contact with the oscillating components, i.e., the cage halves 100, 200 and the ultrasonic welding device, in order to thus prevent damage of the bearing during the ultrasonic welding device process.

Only the bearing inner ring 58 abuts on the support surface 46. The bearing outer ring 60 is not supported in the vertical direction. During the ultrasonic welding a sufficiently large preload force 62 is exerted on the bearing outer ring 60 in the vertical direction toward the support surface 46, whereby the bearing components, bearing outer ring 60, rolling elements 54, and bearing inner ring 58, are clamped to each other. Due to this clamping, no relative movements can arise between the bearing components during the welding process, which relative movements would cause damage in the bearing.

In summary, a simple manufacturing of a bearing cage by ultrasonic welding is disclosed, wherein the resulting cage ensures a secure retaining of the two cage halves even at high rotational speeds. For this purpose the pins and/or the pin receptacles include a sacrificial material on surfaces respectively contacting them, which sacrificial material is melted by the action of ultrasound and subsequently connects the two cage halves.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved two-part bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A pair of components comprising:
    a first cage half and a second cage half configured to be ultrasonically welded to the first cage half to form a bearing cage for a rolling-element bearing,
    the first cage half and the second cage half each comprising an annular base body, a plurality of pins extending axially from the annular base body, and a plurality of pin receptacles complementary to the plurality of pins,
    wherein the plurality of pins of the first cage half are configured to extend into the plurality of pin receptacles of the second cage half and the plurality of pins of the second cage half are configured to extend into the plurality of pin receptacles of the first cage half to form bearing cage bridges and pockets configured to receive a rolling element,
    wherein the pins of the first cage half and/or the pins of the second cage half and/or the pin receptacles of the first cage half and/or the pin receptacle of the second cage half include a body of sacrificial material configured to be ultrasonically melted to connect the first cage half to the second cage half to form the bearing cage,
    wherein the plurality of pins of the first cage half each include an axial end wall,
    wherein the plurality of pin receptacles of the second cage half each include an axial end wall, and
    wherein the bodies of sacrificial material are located axially between the axial end walls of the pins of the first cage half and the axial end walls of the pin receptacles of the second cage half when the plurality of pins of the first cage half are located in the plurality of pin receptacles of the second cage half.

2. The pair of components according to claim 1, wherein the first cage half is configured identically to the second cage half.

3. The pair of components according to claim 1, wherein each pin receptacle includes a radially outer, axially extending ring section configured to radially outwardly support each pin in the each pin receptacle.

4. The pair of components according to claim 3, wherein the axially extending ring section is formed from the annular base body of the cage half.

5. The pair of components according to claim 3, wherein each pin includes a radially outer step that interacts with the ring section of the pin receptacle such that the cage bridges formed by the each pin and the each pin receptacle have a homogeneous outer surface.

6. The pair of components according to claim 1, wherein each pocket has a toroidal geometry comprising a radially inner spherical portion and a radially outer cylindrical portion.

7. The pair of components according to claim 1, wherein the first cage half and the second cage half are each manufactured from a material selected from a group consisting of PEEK and PA4.6, and PA6.6, the material having a carbon fiber content of 15%-30% or a glass fiber content of 15%-30%.

8. The pair of components according to claim 1, wherein the sacrificial material is wedge-shaped, pyramid-shaped, or conical.

9. The pair of components according to claim 1, wherein the first cage half includes at least one primary contact surface that abuts against a secondary contact surface of the second cage half in order to conduct ultrasound into the contact surfaces and/or into the sacrificial material.

10. The pair of components according to claim 1, wherein the first cage half and/or the second cage half includes a secondary contact surface that opposes a primary contact surface and is configured to conduct ultrasound into the primary contact surfaces and/or into the sacrificial material.

11. The pair of components according to claim 10, wherein the first cage half and/or the second cage half includes a wedge-shaped portion configured to conduct ultrasound from the secondary contact surface to the primary contact surfaces.

12. The pair of components according to claim 1, wherein each pin receptacle includes a portion configured to radially overlie a portion of each pin when the each pin is inserted into the each pin receptacle.

13. The pair of components according to claim 1, wherein each of the pins of the first cage half has a hollow interior delimited at one axial end by the axial end wall of the each pin, the hollow interiors being axially open at an axially outer edge of the first cage half.

14. The pair of components according to claim 13, wherein each pin receptacle of the second cage half includes an axially extending support wall configured to radially overlie the axial end wall of the pin received in the each pin receptacle.

15. A bearing cage comprising a pair of components according to claim 13 ultrasonically welded together.

16. A bearing cage comprising a pair of components according to claim 1 ultrasonically welded together.

17. An ultrasonic welding device including a retaining device having a negative shape of an opening on an axial side of the first cage half according to claim 1, the welding device being configured to apply ultrasound to the first cage half to weld the first cage half to the second cage half to form the bearing cage.

* * * * *